(12) United States Patent
Harjanto

(10) Patent No.: US 6,954,778 B2
(45) Date of Patent: Oct. 11, 2005

(54) SYSTEM AND METHOD FOR ACCESSING DIRECTORY SERVICE VIA AN HTTP URL

(75) Inventor: Andy Harjanto, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 843 days.

(21) Appl. No.: 09/781,098

(22) Filed: Feb. 9, 2001

(65) Prior Publication Data

US 2002/0019857 A1 Feb. 14, 2002

Related U.S. Application Data

(60) Provisional application No. 60/217,881, filed on Jul. 12, 2000.

(51) Int. Cl.[7] .............................................. G06F 15/16
(52) U.S. Cl. ........................ 709/203; 709/217; 709/218; 709/219; 707/1; 707/10; 707/104.1
(58) Field of Search ......................... 709/203, 217–219, 709/226, 227, 229; 707/1, 3, 5, 10, 104.1; 713/201

(56) References Cited

U.S. PATENT DOCUMENTS

| 6,016,499 | A  | * | 1/2000 | Ferguson ................. 707/104.1 |
| 6,085,188 | A  | * | 7/2000 | Bachmann et al. ............. 707/3 |
| 6,199,062 | B1 | * | 3/2001 | Byrne et al. .................... 707/3 |
| 6,208,986 | B1 | * | 3/2001 | Schneck et al. ............... 707/3 |
| 6,209,036 | B1 | * | 3/2001 | Aldred et al. ................ 709/229 |
| 6,260,039 | B1 | * | 7/2001 | Schneck et al. .............. 707/10 |
| 6,338,082 | B1 | * | 1/2002 | Schneider ................... 709/203 |
| 6,347,312 | B1 | * | 2/2002 | Byrne et al. .................... 707/3 |
| 6,356,892 | B1 | * | 3/2002 | Corn et al. ..................... 707/3 |
| 6,360,266 | B1 | * | 3/2002 | Pettus ......................... 709/227 |
| 6,366,913 | B1 | * | 4/2002 | Fitler et al. .................... 707/9 |
| 6,418,402 | B1 | * | 7/2002 | King et al. ..................... 704/8 |
| 6,442,549 | B1 | * | 8/2002 | Schneider .................... 707/10 |
| 6,539,382 | B1 | * | 3/2003 | Byrne et al. .................. 707/10 |
| 6,564,370 | B1 | * | 5/2003 | Hunt .......................... 717/122 |
| 6,609,121 | B1 | * | 8/2003 | Ambrosini et al. ............. 707/3 |
| 6,732,160 | B2 | * | 5/2004 | Ambrosini et al. ......... 709/218 |

OTHER PUBLICATIONS

Barrowman, D., et al., "The performance of SQL queries to an X.500 directory system," *Computer Communications*, 1998, 21, 133–146.

Corbi, C., et al., "A directory enabled solution for Internet Roaming," *CSELT Technical Reports*, Apr. 2000, vol. XXVIII(n.2), 273–288.

Howes, T., et al., "The LDAP URL format," Dec. 1997, http://www.ietf.org/rfc/rfc2255.txt?number%20=2255.

Schmidt, B., et al., "Hooking web browsers to LDAP directories, Software Tools" *C/C++ Users Journal*, Jul. 2000, 2–49.

* cited by examiner

Primary Examiner—Ario Etienne
Assistant Examiner—LaShonda Jacobs
(74) Attorney, Agent, or Firm—Woodcock Washburn LLP

(57) ABSTRACT

Information is retrieved from a directory service via a Hyper Text Transport Protocol (HTTP) Universal Resource Locator (URL) query string which is parsed by a diverting module. The diverting module parses the HTTP URL query string into a plurality of portions. The diverting module constructs a directory service compatible query from the plurality of portions and requests information from the directory service with the directory service compatible query.

18 Claims, 4 Drawing Sheets

SYSTEM AND METHOD FOR ACCESSING DIRECTORY SERVICE VIA AN HTTP URL

CROSS-REFERENCE TO RELATED APPLICATIONS

This application claims the benefit of U.S. Provisional Application Ser. No. 60/217881, entitled "Accessing Active Directory via URL", filed on Jul. 12, 2000.

FIELD OF THE INVENTION

The present invention relates generally to directory service access, and more particularly to accessing a directory service via a Hyper Text Transport Protocol (HTTP) Universal Resource Locator (URL).

BACKGROUND OF THE INVENTION

A directory service is a central point in a computer or a computer network where network services, security services, applications, and the like can inform other entities in the computer or network about their services, thus forming an integrated distributed computing environment. The current use of directory services may be classified into several categories. A "naming service" uses a directory as a source to locate an Internet host address or the location of a given server. A "user registry" stores information of all users in a system composed of a number of interconnected machines. The central repository of user information enables a system administrator to administer the distributed system as a single system image. Still another directory service is the MICROSOFT ACTIVE DIRECTORY directory service, a product of Microsoft Corp. of Redmond, Wash., which allows a system administrator to manage users, computers, printers, and other objects.

Conventional access to a directory service, such as a MICROSOFT ACTIVE DIRECTORY directory service is typically achieved by way of a Lightweight Directory Access Protocol (LDAP) query string. For example, a MICROSOFT ACTIVE DIRECTORY directory service can be accessed using LDAP application programming interfaces (APIs). However, using such APIs requires an intimate knowledge of the APIs and requires programming to call the APIs.

An MICROSOFT ACTIVE DIRECTORY directory service may also be accessed using ACTIVE DIRECTORY Service Interfaces (ADSI). However, using ADSI also requires programming.

Another method of accessing a directory service is the use of an LDAP query string formatted as a Universal Resource Locator (URL) query string (i.e., an LDAP URL) that is mapped to the directory service. The LDAP URL includes portions referencing a host port, a scope, an attribute, a query filter, and optional extension mechanisms. The LDAP URL host port portion references a particular directory server. The scope portion defines a search scope for the query. The search scope limits the objects that are searched during a request for information from a directory service. The attribute portion determines the attribute value to return based on the query. The query filter portion operates in a manner similar to commonly known filters, such as the wildcard "*". The optional extension mechanisms are implemented with APIs. This method also assumes that LDAP protocol will be used to for communication.

Importantly, the use of an LDAP URL to access information in a directory service behind a firewall is limited for the reason that many directory service owners (corporations, typically) are unwilling to allow external access to LDAP ports on a firewall, mainly for reasons of security, resource utilization, and overhead issues. Nevertheless, such owners are more likely willing to allow external access to Hyper Text Transport Protocol (HTTP) ports on the firewall.

Therefore, there is a need for access to a directory service via an HTTP port. More particularly, a need exists for a system and method for accessing a directory service by way of an HTTP URL.

SUMMARY OF THE PRESENT INVENTION

The aforementioned need is satisfied by a system and method for accessing a directory service via an Hyper Text Transport Protocol (HTTP) Universal Resource Locator (URL).

In the system and method, information is retrieved from a directory service via an HTTP URL query string which is parsed by a diverting module into a plurality of portions. The diverting module constructs a directory service compatible query from the plurality of portions and submits the directory service compatible query to the directory service.

According to an aspect of the invention, data structure is implemented on a computer readable medium. The data structure used by the module may reside on a server. The data structure comprises includes an HTTP URL query string. The HTTP URL query string includes an HTTP portion representing that the query string is an HTTP URL query string, an anchor point portion representing an anchor point within the directory service for a search to be conducted based on the query string, and a path and query portion defining a search scope based on the anchor point for the search in the directory service.

According to another aspect of the present invention, a system retrieves information from a directory service into an access device via an HTTP URL query string. The system includes a server connected to the access device through an HTTP connection, the server for receiving the query string, for parsing the received query string into a friendly name portion, and for determining whether the friendly name portion is a member of a predetermined set of friendly names. The system further includes a diverting module for receiving the query string from the server if the friendly name portion is a member of the predetermined set of friendly names, for parsing the received query string, for constructing a directory service compatible query based on the parsed string, and for forwarding the directory service compatible query to the directory service.

The above-listed features, as well as other features, of the present invention will be more fully set forth hereinafter.

BRIEF DESCRIPTION OF THE DRAWINGS

The present invention is further described in the detailed description that follows, by reference to the noted drawings by way of non-limiting examples of exemplary embodiments of the present invention, in which like reference numerals represent similar parts throughout the several views of the drawings, and wherein.

DETAILED DESCRIPTION OF THE INVENTION

Figure 5:
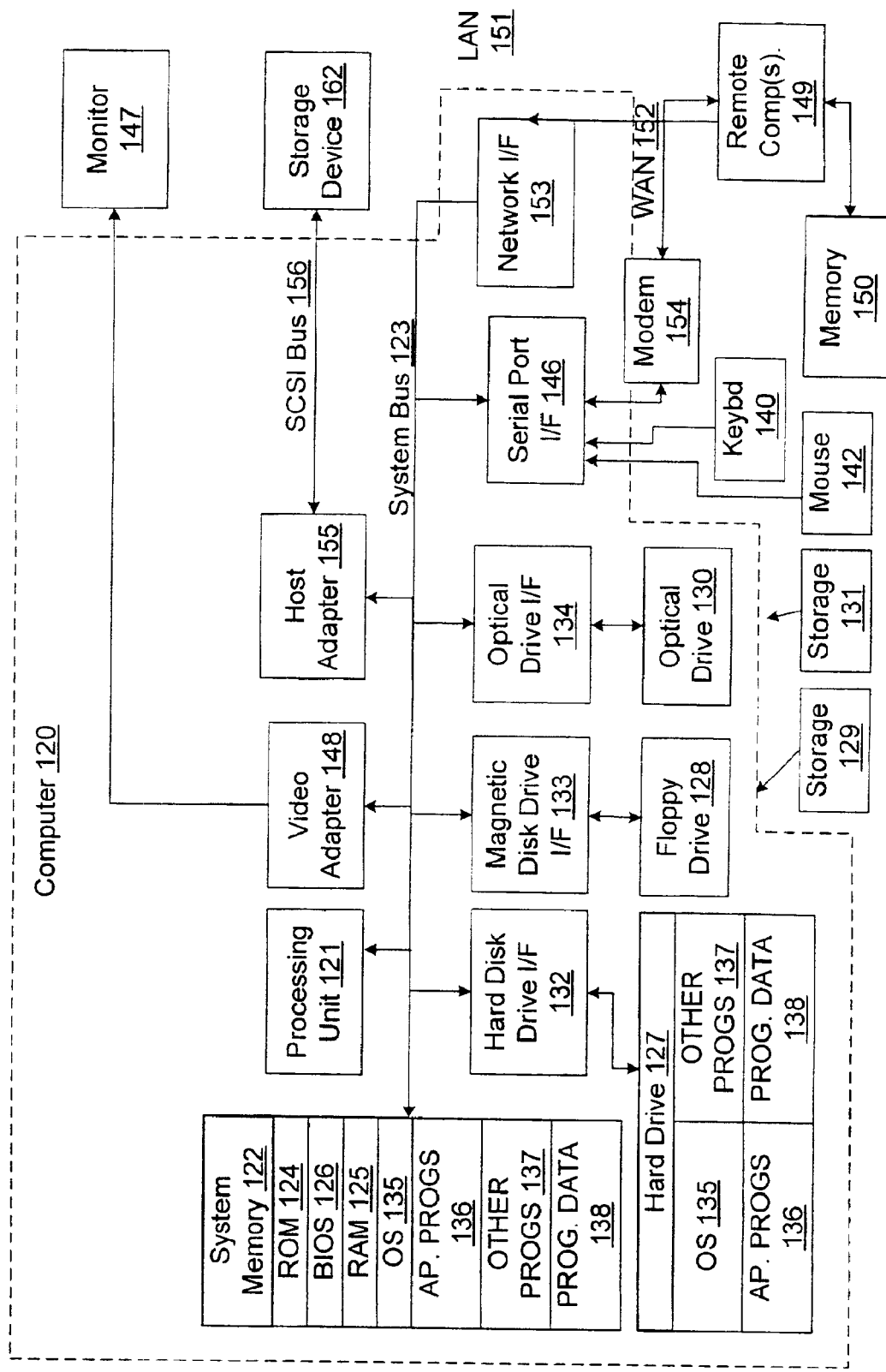
FIG. 5 is a block diagram representing a general purpose computer system in which aspects of the present invention and/or portions thereof may be incorporated.

FIG. 5 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including handheld devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 5, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 5 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 5. The logical connections depicted in FIG. 5 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Figure 1:
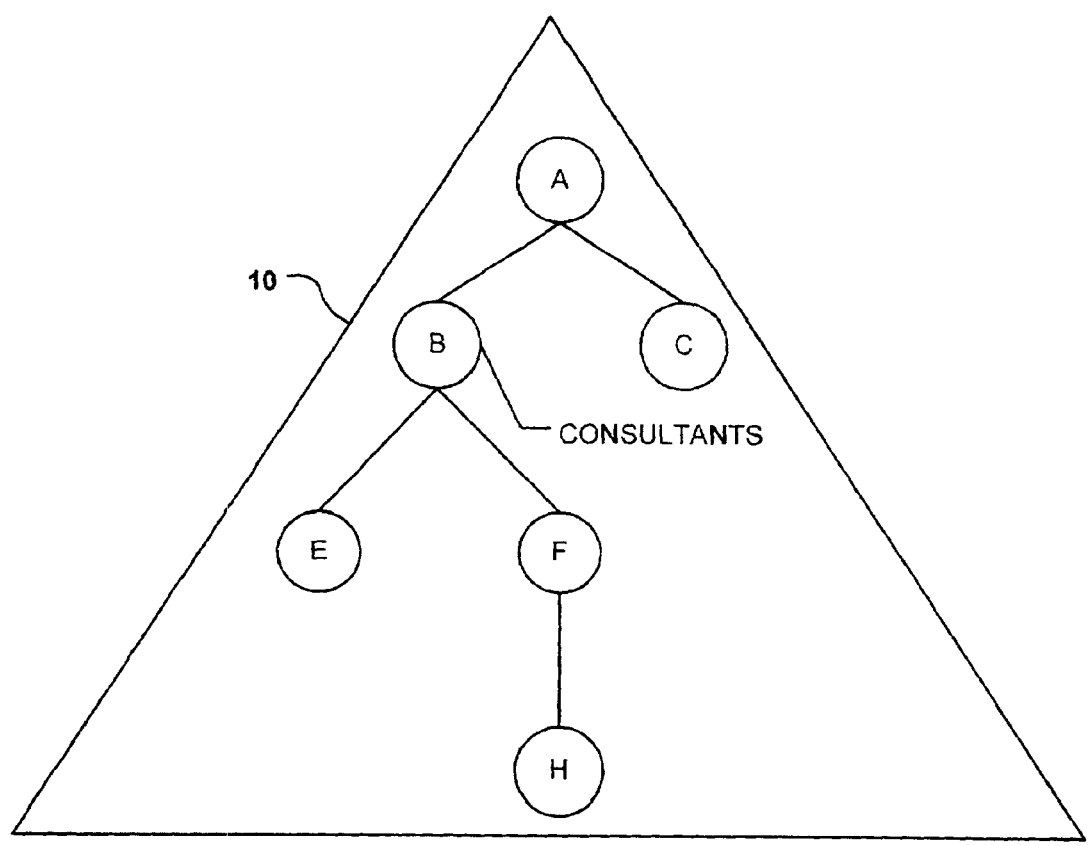
FIG. 1 is a block diagram of an exemplary directory service with which the present invention may be employed.

Turning now to FIG. 1, it is seen that such drawing represents an exemplary directory service hierarchy. The following discussion of the naming hierarchy in FIG. 1 is merely illustrative and is not intended to be limiting. As shown in FIG. 1, the directory service 10 includes a number of objects, with each object represented by a unique name and all of the objects being organized into a hierarchical structure. Thus, for example, the object at the top of the hierarchical structure is named A, which is typically referred to as the "root". Object A has two "children", objects B and C, and objects B and C resides one level below the root and dependent from object A. Object B has two "children", objects E and F, and objects E and F reside two levels below the root and dependent from object B. Object F has one "child", object H, and object H resides three levels below the root and dependent from object F. A particular object thus may be a "parent" of one or more child objects. An object is considered a "parent" if it is located in a next higher level than a "child" object in the hierarchy and the child object depends from such parent object. Objects on the same level of the hierarchy, with the same parent are considered siblings. In this manner, a system administrator may organize objects into a hierarchical structure.

Each object is of a particular object class. For example, there may be a computer object class, a printer object class, and a user object class. As specific examples, object B may represent a printer and may be configured as a printer object class, object C may represent a computer and may be configured as a computer object class, and object E may represent a user and may be configured as a user object class. In this manner, a system administrator may organize objects by class in addition to a hierarchical structure.

Each object may contain attributes, and each attribute may contain a value associated with the attribute. For example, an attribute of a user class object may be a phone number. The value of the attribute may be set to a phone number of that particular user. In this manner, a system administrator may include information regarding objects in a directory service.

The directory service 10 hierarchy may be organized in any predefined manner, for example by the system administrator. Each object in the directory service is typically uniquely identified in the directory and uniquely named for a given parent. Additionally, some directory services, such as the MICROSOFT ACTIVE DIRECTORY include a UserPrincipalName attribute for user class objects. Typically, the UserPrincipalName attribute is set to a value of an e-mail address, for example, JohnSmith@microsoft.com.

Figure 2:
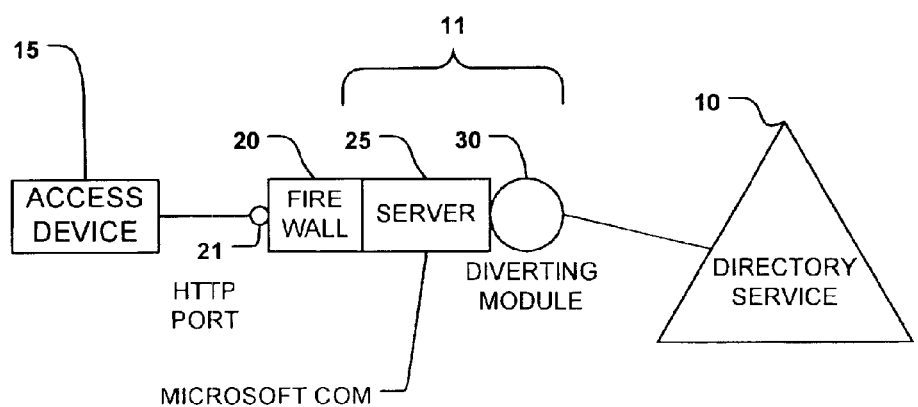
FIG. 2 is a block diagram of a system that accepts an HTTP URL and formulates a directory service compatible query for the directory service of FIG. 1 in accordance with an embodiment of the present invention.

Referring now to FIG. 2, there is shown an exemplary system 11 for accessing the directory service 10 of FIG. 1 based on an HTTP URL query string in accordance with an embodiment of the present invention. As shown in FIG. 2, the system 11 includes a server 25 and a diverting module 30. As may be appreciated, the system 11 receives the HTTP URL query string from an access device 15 by way of an HTTP port 21 on a firewall 20 associated with the server 25, and is coupled to the directory service by way of the diverting module 30. In one embodiment, the server 25 comprises the diverting module 30.

The access device 15 may be a web browser, a cellular phone, a net appliance, or any 10 other device suitable for entering an HTTP URL that is to be delivered to the server 25. Access devices 15 are generally known or should be apparent to the relevant public and therefore need not be described herein in any detail. Thus, the access device 15 may be any particular access device without departing from the spirit and scope of the present invention. In one embodiment, the access device 15 is a personal computer running a MICROSOFT INTERNET EXPLORER web browser, a product of Microsoft Corp. of Redmond, Wash., or the like.

The access device 15 may access the system 11 by an appropriate connection, including a direct connection, an Ethernet connection, an Intranet connection, an Internet connection, a dialup connection, or the like. As shown in FIG. 2, the connection with the system 11 is achieved by way of the firewall 20, so the access device 15 is presumably externally located with respect to the system 11. Nevertheless, the access device 15 may also be internally located so that the firewall 20 is not necessary without departing from the spirit and scope of the present invention.

Server 25 and access device 15 can communicate with each other through the firewall 20 (if present) via any mutually agreeable protocol, such as HTTP, for example. Firewalls 20 and servers 25 are generally known or should be apparent to the relevant public and therefore need not be described herein in any detail. Thus, the firewall 20 may be any particular firewall and the server 25 may be any particular server without departing from the spirit and scope of the present invention. In one embodiment, the server 25 is an Internet Information Server (IIS).

The HTTP port 21 may represent any port through which HTTP communication is enabled. The HTTP port 21 may also represent the default port for communicating web pages with client browsers. In one embodiment, the access device 15 is connected to the server through an HTTP port 21 on the firewall 20.

The firewall 20 is a security system (hardware and/or software) that isolates resources of the system 11 and beyond from objects outside of the system 11. Isolated resources are characterized as inside the firewall, and external equipment is considered outside the firewall. Typically, the firewall 20 serves as a security enclosure around a private LAN of computers and associated peripherals. Generally, the firewall 20 allows for inside objects to request and receive connections to outside objects (e.g., for inside applications to access outside internet nodes, etc.) but prevents outside objects from originating similar connections unless otherwise determined to be allowable.

The directory service 10 is generally known or should be apparent to the relevant public and therefore need not be described herein in any detail. The directory service 10 may be any particular directory service without departing from the spirit and scope of the present invention. In one embodiment, the directory service 10 is the MICROSOFT ACTIVE DIRECTORY directory service. The directory service 10 is connected to the server 25 over a conventional data link, such as for example, an Ethernet connection or a direct connection from the server 25.

Typically, a server such as the server 25 receives a query for the directory service 10 where such query is already in a form amenable to the directory service 10. For example, where the directory service 10 can receive and process an LDAP query string, the server 25 would typically receive a query for the directory service 10 in the form of such LDAP query string.

Importantly, in the present invention, the server 25 receives a query for the directory service 10 where the query is in one form (e.g., an HTTP URL query string) and where the directory service 10 is expecting the query to be in another form (e.g., an LDAP query string). Accordingly, in one embodiment of the present invention, the system 11 includes the diverting module 30 for receiving the query string for the directory service 10 from the server 25 for reformatting the query string into a form amenable to the directory service 10, and for sending the reformatted query string to the directory service 10.

In particular, in an embodiment of the present invention, the diverting module 30 receives the query string from server 25, parses the query string, forms the reformatted query string, and then sends the reformatted query string to the directory service 10. Once the directory service 10 gathers appropriate information based on the received reformatted query string, such information is sent to the server 25 perhaps by way of the diverting module 30. As may be appreciated either the server 25 or the diverting module 30 may format the information in a form amenable to the access device 15. For example, the information may be formatted into a Hyper Text Markup Language (HTML) web page, eXtensible Markup Language (XML), or the like, to be displayed on the browser of the access device 15.

In one embodiment of the present invention, the query string from the access device 15 is an HTTP URL query string having a particular data structure that may be appreciated by the diverting module 30 in the course of reformatting such HTTP URL query string into the form expected by the directory service 10.

Figure 3:
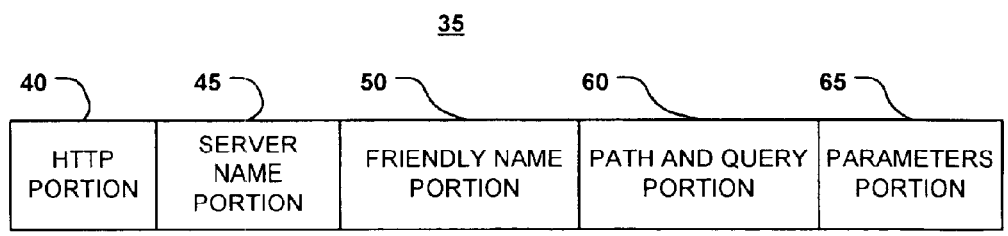
FIG. 3 is a block diagram of a data structure of an HTTP URL for being submitted to the system of FIG. 2 in accordance with an embodiment of the present invention.

FIG. 3 shows a block diagram of such a data structure 35 in accordance with an embodiment of the present invention. As shown in FIG. 3, the data structure 35 of the query string includes an HTTP portion 40, a server name portion 45, a friendly name portion 50, a path and query portion 60, and an optional parameters portion 65. Thus, an exemplary HTTP URL query string may be given by:
http://servername/friendlyname/path-and-query?parameters
As may be appreciated, such HTTP URL query string is to be sent to the server 25 in the manner of a typical HTTP request sent to a typical HTTP server.

In one embodiment of the present invention, the server 25 behind the firewall 20 receives the HTTP URL query string by way of an HTTP port on the firewall 20 and recognizes that the request is to be diverted to the directory service 10 by way of the diverting module 30. Such recognition may for example occur based on the server name portion 45 and/or the friendly name portion 50 of the query string, although other recognition methodologies may be employed without departing from the spirit and scope of the present invention.

Upon receiving the diverted query string, the diverting module 30 parses and deconstructs such HTTP URL query string into the various portions 50–65, constructs the aforementioned reformatted query string, and then transmits same to the directory service 10.

Portions 40–65 are discussed in turn as follows. The HTTP portion 40 contains information representing the beginning of an HTTP URL string. For example, the HTTP portion 40 may contain the string "http://".

The server name portion 45 contains information representing any server name that can be resolved to an Internet Protocol (IP) address. The server name links the access device 15 to a server, such as server 25. For example a server name portion 45 may be "microsoft.com", which would map the access device 15 to the server 25 associated with the name "microsoft.com".

The friendly name portion 50 contains information representing to the server 25 that the query string is to be diverted to the diverting module 30 for parsing. The friendly name may be any name that triggers the diverting module 30 to parse the query string as a request for information from the directory service 10. In one embodiment, the server 25 compares the friendly name against a predetermined set of names. If the friendly name is included in the predetermined set of names, then the server 25 diverts the query string for parsing by the diverting module 30. If not, then the query string is processed as a conventional query string by the server 25. A friendly name is not necessary as a diverting mechanism, for example, a server 25 may be dedicated to directory service 10.

In another embodiment, the diverting module 30 parses the query string and if the friendly name is not included in the predetermined set of names, then the diverting module 30 diverts the query string to the server 25.

In one embodiment of the present invention, the friendly name portion 50 and the friendly name therein also anchors a search scope to a predetermined anchor point in the directory service 10. The friendly name may also serve other purposes including improving query performance, filtering HTTP verbs, canonicalizing long naming, and limiting users to a subset of objects that are pertinent to their queries.

As may be appreciated, an anchor point is an object within the directory service 10 from which the search scope is defined. For example, in the directory service 10 of FIG. 1, a partial query string of:
http://microsoft.com/consultants
maps to the server 25 with the name "microsoft.com", and sets an anchor point, within a directory service 10 associated with the server 25, according to a predetermined criteria associated with the friendly name "consultants". For example, the anchor point for "consultants" may be set at object B, as shown in FIG. 1. In one embodiment of the present invention, no searching takes place on objects higher in the directory service 10 than the anchor point. Here, then, with 'consultants' as the anchor point, the object A will not be included in the search scope. In this manner, a query can be limited to selected branches of the directory service 10.

The path and query portion 60 contains information referencing the path to be searched and query options to further define the search scope. The path sub-portion of the path and query portion 60 defines the boundary or scope of the search scope with respect to the anchor point. The search scope may be defined to include the anchor point itself, to exclude the anchor point but to include one level below the anchor point, to include the anchor point and the entire sub-tree below the anchor point, or the like. The query sub-portion of the path and query portion 60 modifies the search with commonly known filters, such as a wildcard "*" and a slash "/", as will be described further below.

In one embodiment of the present invention, a path and query of "/*" searches the children of the anchor point, a path of "/objectX/*" searches the children of objectX, wherein objectX is a child of the anchor point, and a path of "/objectX//" searches the subtree of objectX, wherein objectX is a child of the anchor point.

For example, and with respect to the directory service 10 of FIG. 1, a partial query string of:
http://microsoft.com/consultants/*
searches the children of B, which are object E and object F. Likewise, a query string of:
http://microsoft.com/consultants/F/*
searches the children of F, which is object H. Similarly, a query string of:
http ://microsoft.com/consultants//
searches the sub-tree of B, which includes object B, object E, object F, and object H, given that object B is the anchor point associated with 'consultants'.

In one embodiment of the present invention, a search may be based on an attribute name by including a path and query of "attribute=attribute value".

For example, and with respect to the directory service 10 of FIG. 1, a partial query string of:
http://microsoft.com/consultants//givenName=John
searches the sub-tree of B, which includes object B, object E, object F, and object H. Additionally, the query sub-portion of "givenName=John" searches all objects within the search scope as described above, and searches for an attribute of "givenName" with a value of "John".

Similarly, searches may be based on object class by including a query sub-portion of ".object class". For example, a query sub-portion of "*.user" searches for all objects in the directory service with an object class of "user" within the defined search scope.

For example, and with respect to the directory service 10 of FIG. 1, a partial query string of:
http://microsoft.com/consultants//*.user
searches the sub-tree of B, which includes object B, object E, object F, and object H. Additionally, the query sub-portion of "*.user" searches for all objects within the search scope as described above, and searches for all objects of object class "user".

Additionally, a wildcard may be used in query portion. For example, a query string of:
http://microsoft.com/consultants//John*.user
searchers the sub-tree of B, which includes object B, object E, object F and object H. Additionally, the query sub-portion of "John*.user" searchers for all objects within the search scope as described above, and searches for all objects of object class "user" and with its object name starts with "John".

The parameters portion 65 may contain information referencing optional parameters. Such optional parameters may, for example, modify default parameter values, such as PageSize, which specifies the page size to return, and TimeOut, which determines how long to wait for a response before timing out. Also, the parameters portion 65 may be used to request an attribute be returned to server 25 from the directory service 10, as described in more detail below.

As discussed above, the HTTP URL request may be responded to by the system 25 with an HTML page. In addition, the response may be in an XML format. In one embodiment of the present invention, a parameter in the parameters portion 65 of the HTTP query string may be set to specify the type of response. For example, a parameter may be set to request a HTML format, or other form of documents. Optionally, the response may include error messages.

Figure 4:
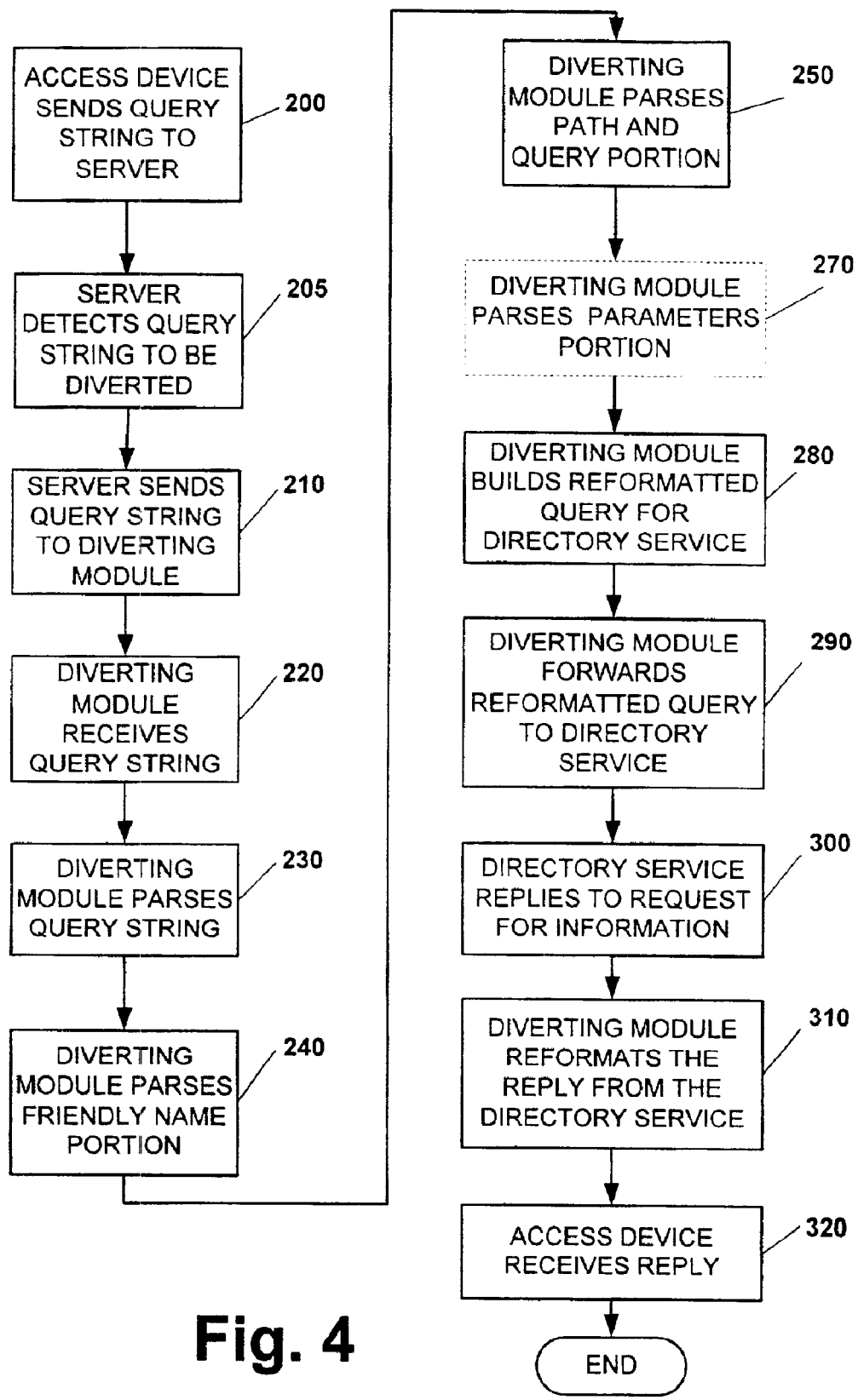
FIG. 4 is a flow chart of an exemplary method employing the system of FIG. 2 and the data structure of FIG. 3 in accordance with an embodiment of the present invention.

In one embodiment of the present invention, the parameters portion 65 contains information referencing an attribute value to be returned. For example, the parameters portion 65 may be specified as "?attr=attributename" in the HTTP query string. If a particular attribute value is to be returned, as triggered by the "?attr=" portion of the query string, the directory service 10 returns the value of the attribute. If no attribute is to be returned, the directory service 10 returns a default set of attributes for each object of the defined search, such as the URL, name, and class of the object. For example, a query string of:
http://microsoft.com/consultants/?attr=phonenumber,title
returns the value in the attribute phone number and title of object B, if such attribute exists for the object. Referring now to FIG. 4, a method of operating the system 25 to access a directory service 10 is shown. As seen at step 200, the access device 15 sends an HTTP URL query string to the server 25. This step is similar to conventional server access via an HTTP URL query string. For example, the HTTP URL query string may be
http://microsoft.com/consultants//sn=Smith
The query string is received at the http port 21 and firewall 20 and passes through to the server 25 as a conventional HTTP URL query string.

At step 205, the server 25 detects that the query string is to be diverted to diverting module 30. In this step, the server 25 may parse the friendly name portion 50 of the query string and compare the friendly name portion against a predetermined set of names, as described above. If the friendly name is in the predetermined set of names, the system proceeds to step 210. Otherwise, the server 25 processes the HTTP URL as a conventional HTTP URL.

At step 210, the server 25 diverts the query string by sending the query string to the diverting module 30. At step 220, the diverting module 30 receives the query string and at step 230, the diverting module 30 parses the query string. Particularly, the diverting module 30 parses the query string to resolve a friendly name portion 50 at step 240, a path and query portion 55 at step 250, and a parameters portion 65 at step 270.

At step 240, the diverting module 30 parses the query string into a friendly name portion 50, as the string "consultants" and an anchor point is set according to a predetermined anchor point list associated with the friendly name. For example, the anchor point associated with the friendly name "consultants" may be object B in the directory service 10, as shown in FIG. 1.

At step 250, the diverting module 30 parses the query string into a path sub-portion as the string "//". This sets the search scope to the entire sub-tree of the anchor point. In the directory service 10 of FIG. 1, with an anchor point of object B, the search scope includes objects B, E, F, and H. The diverting module 30 parses the query string into a query sub-portion as the string "sn=Smith". This sets the query sub-portion to search for an attribute of "sn", or surname, with an attribute value of "Smith".

At step 270, the diverting module 30 parses the query string into a parameters portion 65, as a null string. Thus, no optional parameters are included in the query string and default values are to be used.

At step 280, the diverting module 30 builds a reformatted query that is compatible with the directory service 10. Particularly, the reformatted query searches the search scope determined in steps 240 and 250 and with the parameters determined in step 270. For example, the diverting module 30 builds a reformatted query that accesses the directory service 10 and searches user objects of objects B, E, F, and H for each object having an attribute of "sn" with an attribute value of "Smith".

At step 290, the diverting module 30 forwards the reformatted query to the directory service 10 and at step 300, the directory service 10 replies to the reformatted query. The reply may be, for example, an XML formatted response or an LDAP response. At step 310, the diverting module will reformat the response from directory service 10 to a format that is expected by the access devices 15, for example HTML or XML. At step 320, the access device 15 receives the information from the directory service 10 by way of server 25 and perhaps the diverting module 30.

Thus, in the present invention, a web page may be constructed with HTTP URL links tailored to access information in the directory service 10, and a user of the web page may access such information without being concerned with the actual construction of the links or understanding of APIs to access the directory service 10. Therefore, the present invention provides an HTTP URL formatted query string employed to gain access to a directory service 10.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular elements, steps, and/or embodiments, the invention is not intended to be limited to the particulars disclosed herein; rather, the invention extends to all functionally equivalent structures, methods and uses, such as are within the spirit and scope of the appended claims. Those skilled in the art, having the benefit of the teachings of the present disclosure, may effect numerous modifications thereto and changes may be made without departing from the scope and spirit of the invention in its aspects.

What is claimed is:

1. A data structure implemented on a computer readable medium, the data structure comprising a Hyper Text Transport Protocol (HTTP) Universal Resource Locator (URL) query string including:
an HTTP portion representing that the query string is an HTTP URL query string;
an anchor point portion representing an anchor point within the directory service for a search to be conducted based on the query string, wherein the anchor point is one of a predetermined set of anchor points, whereby access is granted to the directory service because the anchor point is contained in the predetermined set of anchor points; and
a path and query portion defining a search scope based-on the anchor point for the search in the directory service.

2. The data structure of claim 1 wherein the query string further includes a server name portion representing a server name through which the directory service is accessible.

3. The data structure of claim 1 wherein the search scope is defined relative to the anchor point in the directory service.

4. The data structure of claim 1 wherein the query string further includes a parameters portion representing an attribute to be returned based on the search.

5. A computer readable medium having stored thereon a data structure comprising a Hyper Text Transport Protocol (HTTP) Universal Resource Locator (URL) query string including:
an HTTP portion representing that the query string is an HTTP URL query string;
an anchor point portion representing an anchor point within the directory service for a search to be conducted based on the query string, wherein the anchor point is one of a predetermined set of anchor points, whereby access is granted to the directory service because the anchor point is contained in the predetermined set of anchor points; and
a path and query portion defining a search scope based on the anchor point for the search in the directory service.

6. The medium of claim 5 wherein the query string further includes a server name portion representing a server name through which the directory service is accessible.

7. The medium of claim 5 wherein the search scope is defined relative to the anchor point in the directory service.

8. The medium of claim 5 wherein the query string further includes a parameters portion representing an attribute to be returned based on the search.

9. A method of retrieving information from a directory service via a Hyper Text Transport Protocol (HTTP) Universal Resource Locator (URL) query string, the method comprising:
parsing the query string into an anchor point portion representing an anchor point within the directory service for a search to be conducted based on the query string;
parsing the query string into a path and query portion defining a search scope based on the anchor point for the search in the directory service;
comparing the anchor point against a predetermined set of anchor points and granting access to the directory service if the anchor point is contained in the predetermined set of anchor points;
constructing a directory service compatible query from the plurality of parsed portions; and
forwarding the constructed query to the directory service, wherein the directory service conducts the search based upon the forwarded query to produce search results.

10. The method of claim 9 further comprising receiving the search results from the directory service.

11. The method of claim 10 comprising receiving the search results from the directory service in a Hyper Text Markup Language format.

12. The method of claim 10 comprising receiving the search results from the directory service in an eXtensible Markup Language format.

13. The method of claim 9 further comprising parsing the HTTP URL query string into a parameters portion representing an attribute to be returned based on the search.

14. A computer-readable medium having stored thereon computer executable instructions for retrieving information from a directory service via a Hyper Text Transport Protocol (HTTP) Universal Resource Locator (URL) query string, the instructions being organized into modules including:
a first module for parsing the query string into an anchor point portion representing an anchor point within the directory service for a search to be conducted based on the query string;
a second module for parsing the query string into a path and query portion defining a search scope based on the anchor point for the search in the directory service;
a third module for constructing a directory service compatible query from the plurality of parsed portions;
a fourth module for forwarding the constructed query to the directory service, wherein the directory service conducts the search based upon the forwarded query to produce search results, and;
a fifth module for comparing the anchor point against a predetermined set of anchor points and granting access to the directory service if the anchor point is contained in the predetermined set of anchor points.

15. The medium of claim 14, further comprising a fifth module for receiving the search results from the directory service.

16. The medium of claim 15, wherein the fifth module receives the search results from the directory service in a Hyper Text Markup Language format.

17. The medium of claim 15, wherein the fifth module receives the search results from the directory service in an eXtensible Markup Language format.

18. The medium of claim 14 further comprising a fifth module parsing the HTTP URL query string into a parameters portion representing an attribute to be returned based on the search.

* * * * *